US010514475B2

(12) United States Patent
Coates et al.

(10) Patent No.: US 10,514,475 B2
(45) Date of Patent: Dec. 24, 2019

(54) POST-CRITICAL REFLECTION MUTING IN SEISMIC MIGRATION

(71) Applicant: SCHLUMBERGER TECHNOLOGY CORPORATION, Sugar Land, TX (US)

(72) Inventors: Richard Coates, Katy, TX (US); Cintia Lapilli, Houston, TX (US); Hannah Flath, Houston, TX (US); Dmitry Kulakov, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 665 days.

(21) Appl. No.: 15/251,866

(22) Filed: Aug. 30, 2016

(65) Prior Publication Data
US 2018/0059274 A1    Mar. 1, 2018

(51) Int. Cl.
*G01V 1/36*    (2006.01)
*G01V 1/28*    (2006.01)

(52) U.S. Cl.
CPC ............. *G01V 1/36* (2013.01); *G01V 1/282* (2013.01); *G01V 1/28* (2013.01); *G01V 2210/51* (2013.01); *G01V 2210/67* (2013.01)

(58) Field of Classification Search
CPC . G01V 1/282; G01V 1/36; G01V 1/51; G01V 1/67
See application file for complete search history.

(56) References Cited

U.S. PATENT DOCUMENTS

| 5,265,068 | A  | * | 11/1993 | Wang ..................... G01V 1/282 367/73 |
| 2012/0044784 | A1 | * | 2/2012 | Pierle ..................... G01V 1/30 367/38 |
| 2014/0309938 | A1 | * | 10/2014 | Bardainne .............. G01V 1/003 702/14 |
| 2016/0061976 | A1 | * | 3/2016 | Hu .......................... G01V 1/48 367/7 |

(Continued)

OTHER PUBLICATIONS

Janke, Mathematical Structures for Computer Graphics, John Wiley & Sons, Nov. 3, 2014, pp. 27 (Year: 2014).*
(Continued)

*Primary Examiner* — Michael J Dalbo
(74) *Attorney, Agent, or Firm* — Michael Guthrie

(57) ABSTRACT

A method for processing seismic data includes obtaining a velocity model, determining a critical angle for an interface represented in the velocity model based on a ratio between velocity of the seismic wave on first and second sides of the interface, determining an orientation of a normal vector extending normal to a location of the interface, determining an orientation of an arrival direction vector of a wavefield at the location of the interface, calculating an angle between the normal vector and the arrival direction vector, determining that the angle between the normal vector and the arrival direction vector is greater than the critical angle at the location, and attenuating the wavefield associated with the location in response to determining that the angle between the normal vector and the arrival direction vector is greater than the critical angle at the location.

20 Claims, 10 Drawing Sheets

(56) References Cited

U.S. PATENT DOCUMENTS

2016/0109592 A1* 4/2016 Sun .................. G01V 1/303
                                                    367/46
2017/0276813 A1* 9/2017 Sun .................. G01V 1/303

OTHER PUBLICATIONS

Baysal, et al., "A two-way nonreflecting wave equation," Geophysics, 1984, vol. 49, pp. 132-141.

Dickens, et al., "RTM angle gathers using Poynting vectors," SEG, 2011.

Fletcher, et al., "Suppressing artifacts in prestack reverse time migration," SEG, 2005 Annual Meeting, pp. 2049-2052.

Guitton, et al., (2006) "Least-square Attenuation of Reverse Time Migration Artifacts," SEG, 2006.

Horn, et al., "Determining optical flow," Artificial Intelligence, 17, 1981, pp. 185-203.

Hu, et al., "Optical flow equation based imaging condition for elastic reverse time migration," SEG, 2014.

Jin, et al., "Image Quality Enhancement via an Automatic Far-Offset Mute," SEG, 1996.

Jones, I. F. (n.d.) "Tutorial: the seismic response to strong vertical velocity change".

Li, et al., "Suppressing artifacts in 2D RTM using the Poynting Vector," NSGAPC, 2013.

Loewenthal, et al., "Suppressing the unwanted reflections of the full wave equation," Geophysics, Jul. 1987, vol. 52, No. 7, pp. 1007-1012.

Qin, et al., "Finite-difference solution of the eikonal equation along expanding wavefronts," Geophysics, 1992, vol. 57, pp. 478-487.

Yan, et al., "A new angle-domain imaging condition for prestack reverse-time migration," SEG, 2009.

Yoon, et al., "Reverse Time Migration using the Poynting Vector," Exploration Geophysics, 2006, vol. 37, pp. 102-107.

Yoon, et al., "Challenges in reverse-time migration," SEG, 2004.

Zhang, "RTM angle gathers and Specular Filter RTM using optical flow," SEG, 2014.

* cited by examiner

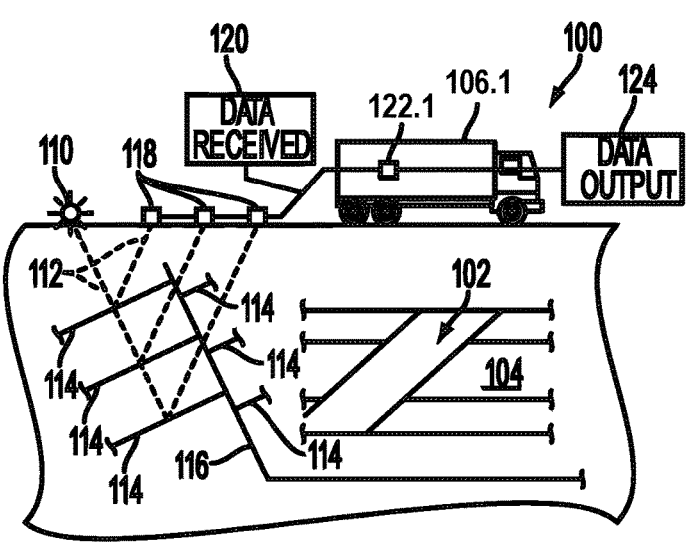
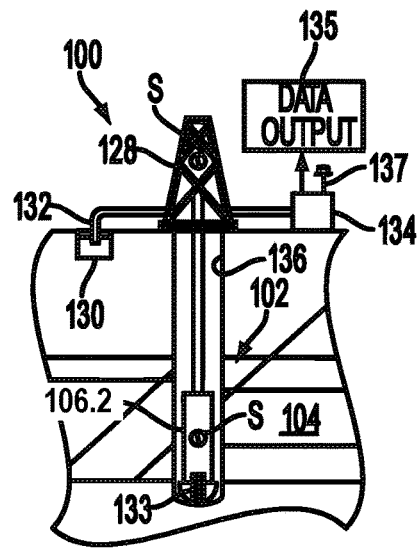
FIG. 1A
FIG. 1B
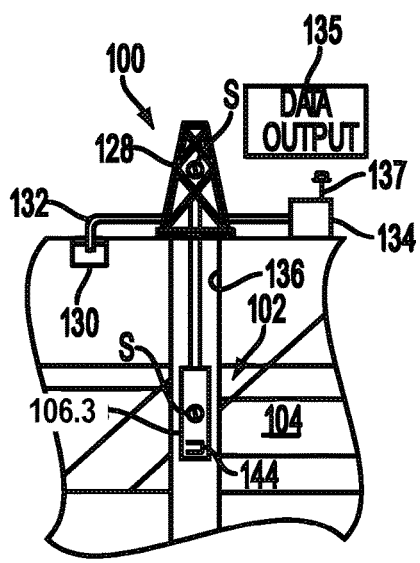
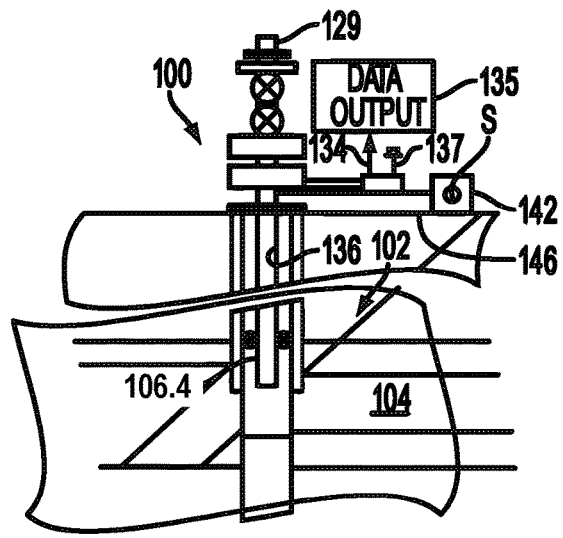
FIG. 1C
FIG. 1D

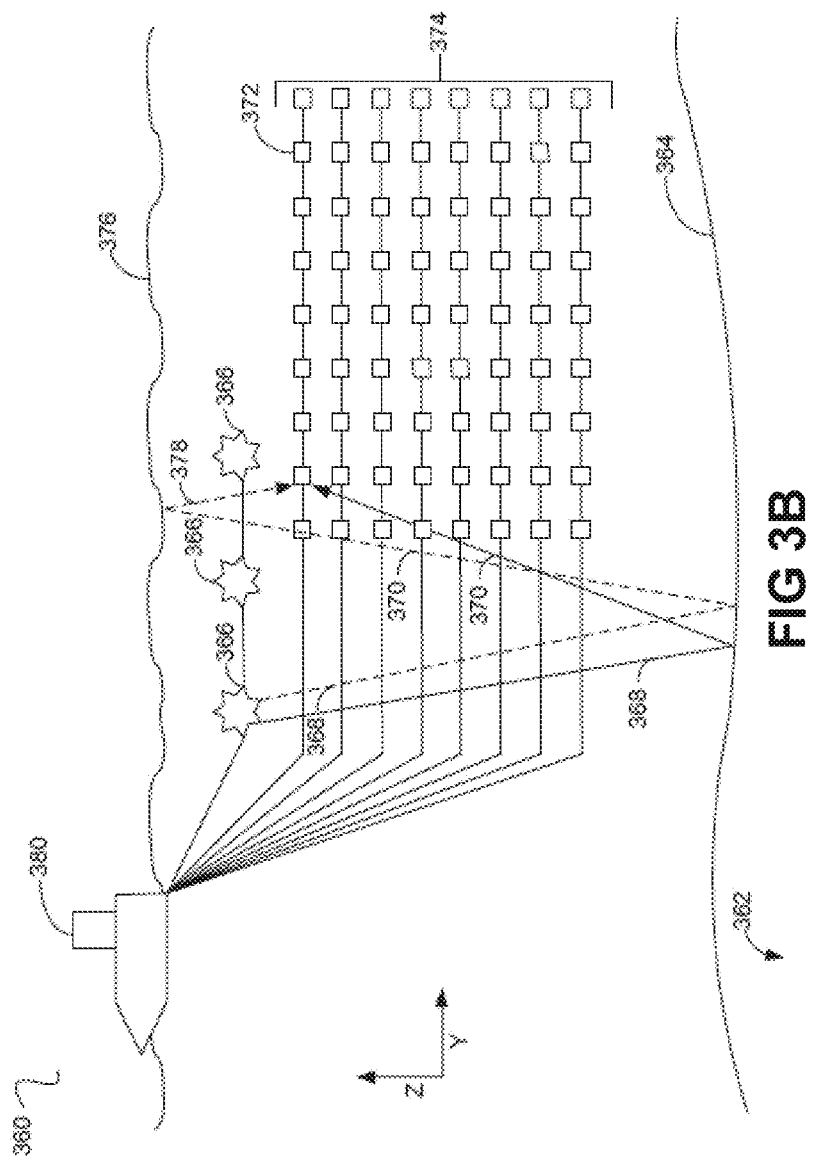

POST-CRITICAL REFLECTION MUTING IN SEISMIC MIGRATION

BACKGROUND

Seismic imaging through migration depends in part on modelling the behavior of seismic waves. The subterranean domain being imaged generally includes interfaces wherein the velocity of the seismic wave propagation changes. At such an interface with a velocity change, wave behavior depends on the incident angle. When the incident angle is less than the critical angle, part of the energy is reflected and part transmitted. At the critical angle, the transmitted wave travels parallel or along the interface. Beyond the critical angle, the energy is reflected.

Energy from waves impinging on the interface at angles greater than or equal to the critical angle can cause artifacts in the seismic image. Since the critical angle is smaller for high-contrast interfaces, this post-critical energy commonly causes artifacts at salt or carbonate boundaries or the seafloor, for example. However, since the normal to the interface and direction of incoming waves can change rapidly, particularly for rugose interfaces, there is often a complex set of alternating pre-critical and post-critical regions. These can vary both with reflector location and from shot to shot.

Attempts to remove these artifacts involve time-consuming muting (setting to zero) of data in the sensor offset location and time domain, which is related in a non-linear, multi-value way to the reflection locations.

SUMMARY

Embodiments of the disclosure may provide a method for processing seismic data. The method includes obtaining a velocity model constructed based on seismic waves that propagated through a subterranean domain, determining a critical angle for an interface represented in the velocity model based on a ratio between velocity of the seismic wave on a first side of the interface and velocity of the seismic wave on a second side of the interface, determining an orientation of a normal vector extending normal to a location of the interface, determining an orientation of an arrival direction vector of a wavefield at the location of the interface, calculating an angle between the normal vector and the arrival direction vector, determining that the angle between the normal vector and the arrival direction vector is greater than the critical angle at the location, and attenuating the wavefield associated with the location in response to determining that the angle between the normal vector and the arrival direction vector is greater than the critical angle at the location.

In an embodiment, the velocity model includes a migration velocity propagation model.

In an embodiment, the method also includes displaying the wavefield after the attenuating, where the attenuating is configured to remove an artifact from the model.

In an embodiment, determining the orientation of the arrival direction vector comprises determining a finite-different solution to an eikonal equation.

In an embodiment, calculating the angle between the normal vector and the arrival direction vector comprises calculating an inverse cosine of a dot product of the normal vector and the arrival direction vector.

In an embodiment, the method also includes determining a plurality of orientations of a plurality of normal vectors defined at a plurality of locations along the interface, determining a plurality of orientations of a plurality of arrival direction vectors of the wavefield at the plurality of locations, determining angles between the plurality of normal vectors and the plurality of arrival direction vectors at the respective locations, and attenuating respective portions of the wavefield associated with respective locations along the interface, at least when the angle between the normal vector and the arrival direction vector at the respective location is greater than the critical angle.

In an embodiment, attenuating includes determining a lower angle threshold below the critical angle, assigning a first weight to angles below the lower angle threshold, determining an upper angle threshold above the critical angle, assigning a second weight to angles above the upper angle threshold, wherein the second weight is less than the first weight, assigning a range of weights between the first and second weights to angles between the lower angle threshold and the upper angle threshold, to smoothly transition from unattenuated to attenuated portions of the wavefield, and multiplying one or more portions of the wavefield by the first weight, the second weight, or a weight of the range of weights based on the respective angles of incidence.

In an embodiment, the method also includes smoothing the plurality of normal vectors, the range of weights, or both to reduce variation spatially.

In an embodiment, the method also includes preselecting the interface based on a depth range, a velocity ratio associated with the interface, or a combination thereof.

In an embodiment, the method further includes determining that the interface is likely to generate artifacts prior to attenuating.

Embodiments of the disclosure may also include a computing system including one or more processors, and a memory system including one or more non-transitory media storing instructions that, when executed by at least one of the one or more processors, cause the computing system to perform operations. The operations include obtaining a velocity model constructed based on seismic waves that propagated through a subterranean domain, determining a critical angle for an interface represented in the velocity model based on a ratio between velocity of the seismic wave on a first side of the interface and velocity of the seismic wave on a second side of the interface, determining an orientation of a normal vector extending normal to a location of the interface, determining an orientation of an arrival direction vector of a wavefield at the location of the interface, calculating an angle between the normal vector and the arrival direction vector, determining that the angle between the normal vector and the arrival direction vector is greater than the critical angle at the location, and attenuating the wavefield associated with the location in response to determining that the angle between the normal vector and the arrival direction vector is greater than the critical angle at the location.

Embodiments of the disclosure may further include a non-transitory medium storing instructions that, when executed by at least one processor of a computing system, cause the computing system to perform operations. The operations include obtaining a velocity model constructed based on seismic waves that propagated through a subterranean domain, determining a critical angle for an interface represented in the velocity model based on a ratio between velocity of the seismic wave on a first side of the interface and velocity of the seismic wave on a second side of the interface, determining an orientation of a normal vector extending normal to a location of the interface, determining an orientation of an arrival direction vector of a wavefield at the location of the interface, calculating an angle between the normal vector and the arrival direction vector, determining that the angle between the normal vector and the arrival direction vector is greater than the critical angle at the location, and attenuating the wavefield associated with the location in response to determining that the angle between the normal vector and the arrival direction vector is greater than the critical angle at the location.

Thus, the computing systems and methods disclosed herein are more effective methods for processing collected data that may, for example, correspond to a surface and a subsurface region. These computing systems and methods increase data processing effectiveness, efficiency, and accuracy. Such methods and computing systems may complement or replace conventional methods for processing collected data. This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

DETAILED DESCRIPTION

Figure 2:
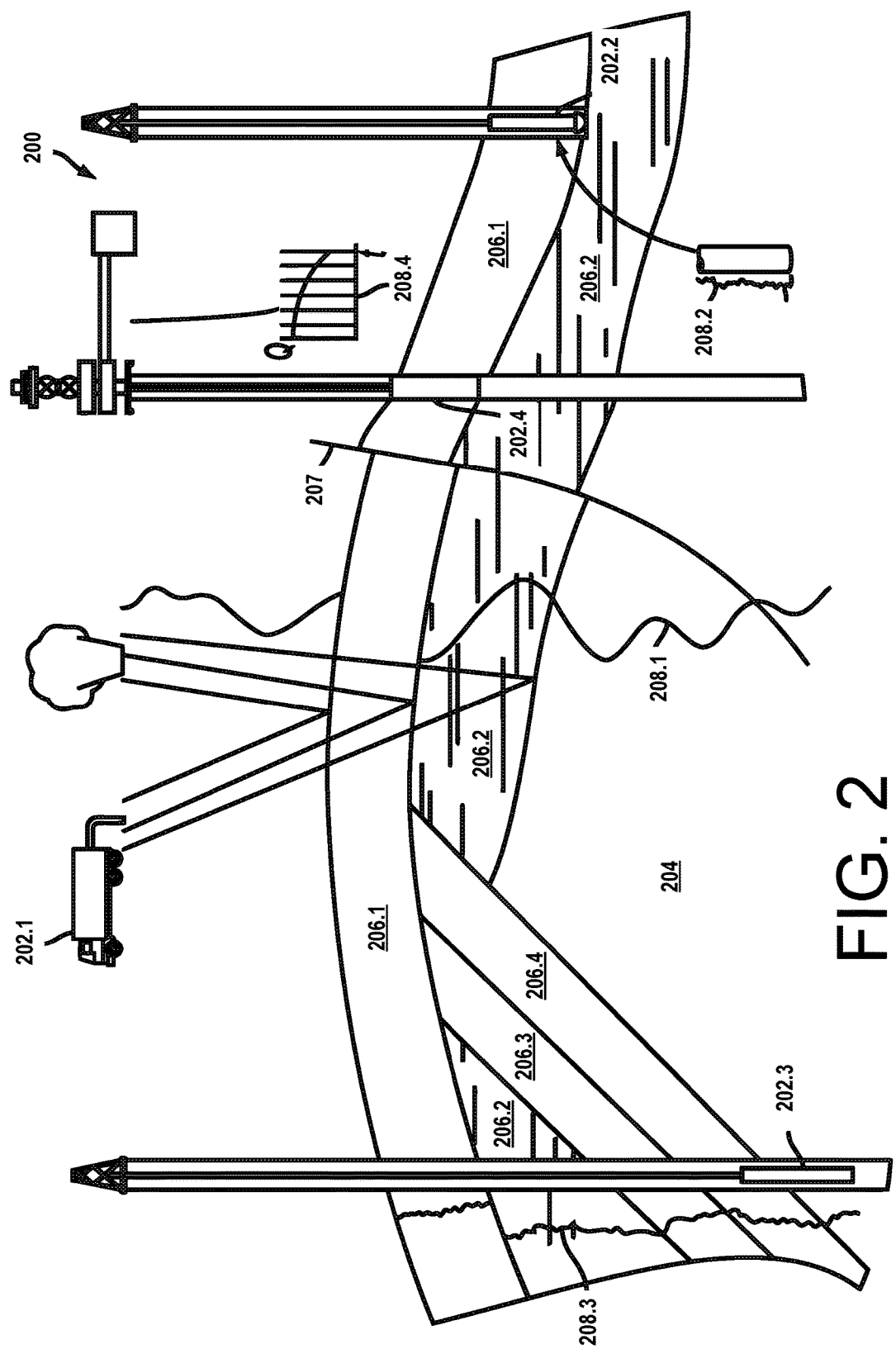

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that typically provides a resistivity or other measurement of the formation at various depths.

A production decline curve or graph 208.4 is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.1 from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3A:
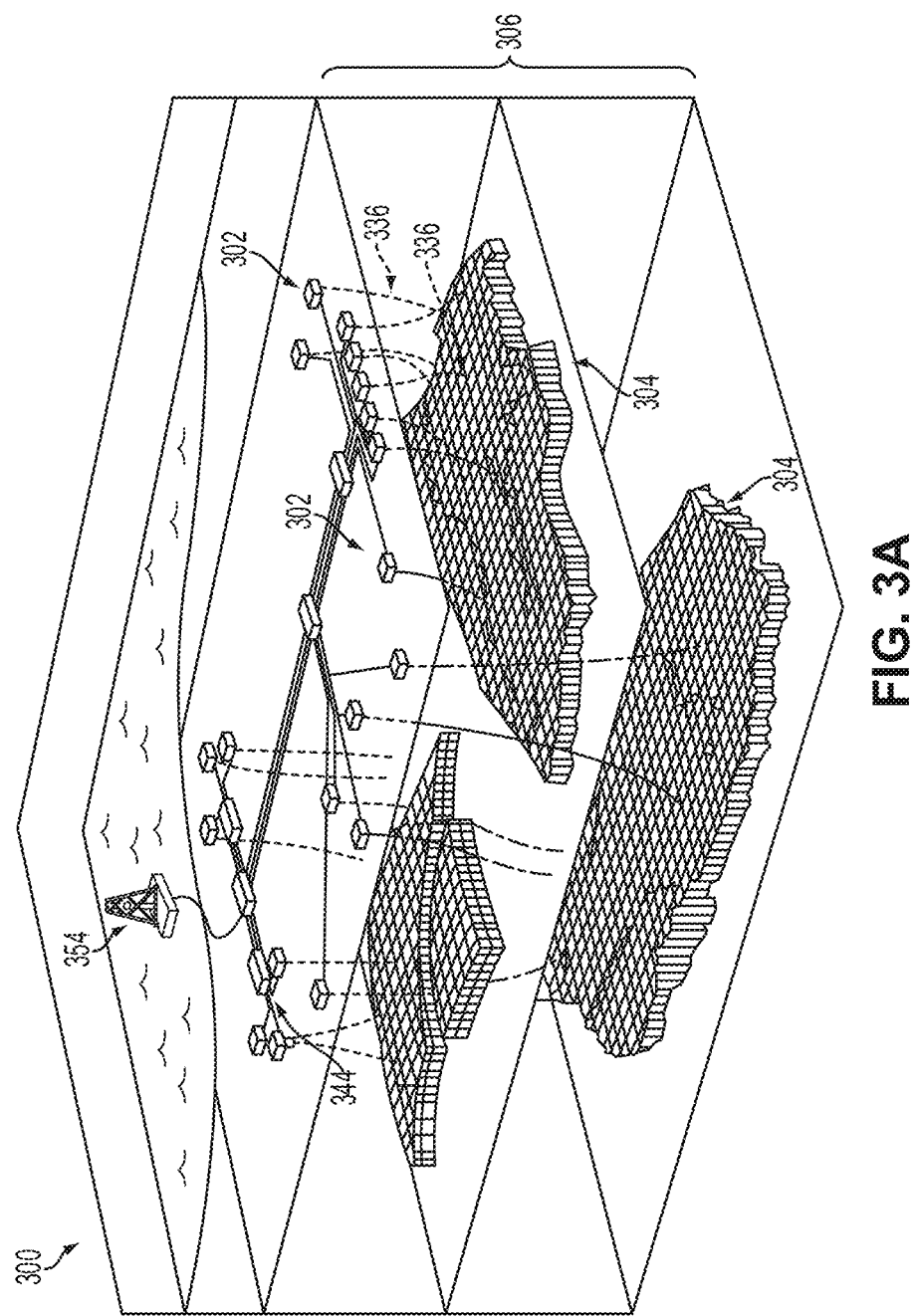

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Figure 4:
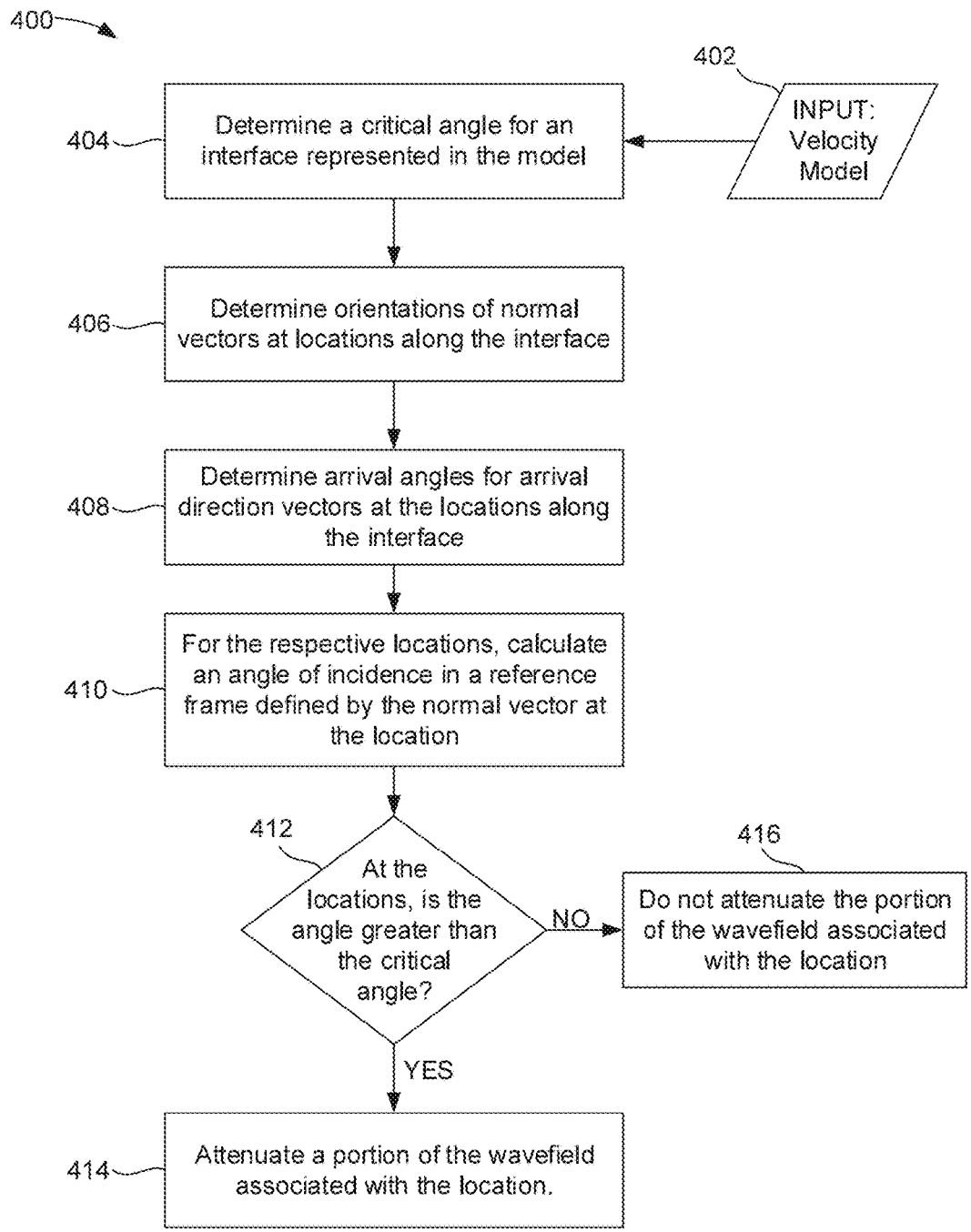
FIG. 4 illustrates a flowchart of a method for muting post-critical reflections, according to an embodiment.

FIG. 4 illustrates a flowchart of a method 400 for seismic processing, according to an embodiment. In particular, the method 400 illustrated may be used for "muting" or otherwise attenuating data being used to generate a seismic image (after the data has been numerically propagated through a seismic velocity model), thereby, for example, removing artifacts that may be caused by post-critical reflections. Accordingly, the method 400 may begin by obtaining such a velocity model, as at 402, e.g., as input into the method 400. A variety of such velocity models are known, and may be obtained based well-log data collected using sensors in a wellbore, and/or through generating and recording seismic waves that are propagated through a subterranean domain, reflected from reflectors (e.g., interfaces between different types of formations). This recording can be accomplished using recording devices, such as geophones, hydrophones, or the like. The velocity model may thus represent characteristics of the physical, subterranean domain.

The method 400 may also include determining a critical angle $\Theta$ for an interface represented in the model, as at 404. The critical angle $\Theta$ may be determined based on a ratio of the velocity of the seismic waves on either (first ($V_1$) and second ($V_2$)) side of the interface, which may be above and below the interface, in the specific case of a horizontal interface. Accordingly, the critical angle $\Theta$ may be derived from the expression $\sin \Theta = V_1/V_2$. In some embodiments, the interface may be preselected or otherwise identified as potentially being an interface where artifacts are likely to occur. For example, in some situations, interfaces between two specific types of rock, between the water and the ocean bed, or within a targeted depth (e.g., relatively shallow), may be predetermined as likely to cause artifacts. Thus, the method 400 may select the interface either by direct selection (e.g., a user identifying an individual interface in a model) or selecting interfaces according to specific criteria (e.g., within a certain depth range, between two specific layers, where large velocity differentials are evident, etc.). In other embodiments, the method 400 may be applied to each of the interfaces found in the model.

The method 400 may also include determining orientations of normal vectors at locations along the interface, as at 406. In general, velocity models may be gridded, and thus locations may be established at each (or any subset) of the grids in the model that represent the interface. In other embodiments, the locations, as mentioned with respect to the method 400, of the interface may be established in other ways. In either case, the locations may represent points along the interface, at which information about a wavefield (as will be described below) and information about the interface may be determined. In some embodiments, the normal vector orientations may be smoothed spatially, e.g., to reduce a variation as between neighboring normal vectors.

Figure 5:
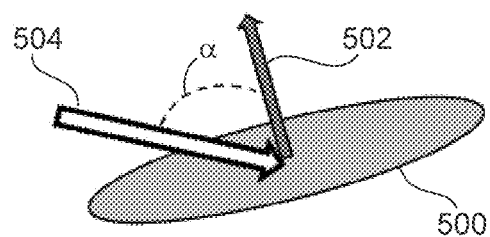
FIG. 5 illustrates a conceptual view of a seismic ray and an interface, according to an embodiment.

Reference is additionally made to FIG. 5, in which several angles that are employed in accordance with some aspects of the disclosed method 400 are illustrated. In FIG. 5, an interface 500 is shown, disposed at an angle. The interface 500 may be representative of any type of reflector in a subterranean domain. A normal vector 502, which may be a unit vector, is defined with respect to the interface 500, specifically, perpendicular thereto. The normal vector 502 may extend at an orientation, which, in at least one embodiment, may be defined by the dip and strike angles of the interface 500 with respect to a reference plane (which may or may not be horizontal). Thus, the determination of the orientation of the normal vector 502 may yield, or be based upon, the determination of the dip and strike angles of the interface 500, but in other embodiments, may be otherwise defined as would be known to those of skill in the art.

The method 400 may then proceed to determining arrival direction vectors at the locations along the interface, for the wavefield emanating from the seismic source, as at 408. This may be achieved using a finite-value solution to the eikonal equation, or through any other suitable technique (e.g., ray-tracing-shooting, or two-point; calculation of the Poynting vector, use of the optical flow calculation, etc.). Referring again to FIG. 4, an arrival direction vector 504 is shown, which may (depending on the critical angle) be at least partially reflected by the interface 500. The arrival direction vector 504 may be a unit vector representing a direction of a ray contained within the wavefield (e.g., generated by a seismic source) as it meets the interface 500. In some embodiments, the arrival directions of several such rays may be smoothed spatially, e.g., to reduce variations between neighboring calculated arrival directions.

The method 400 may then proceed to calculating an angle of incidence in a reference frame defined by the normal vector to the interface, as at 410. For example, a dot product of the two unit vectors, the arrival direction vector and normal vector, at each location may be calculated; thus, the arccosine of the result may yield the angle of incidence in the reference frame defined by the normal to the interface. In other embodiments, other ways of calculating this angle may be employed. As shown in FIG. 5, this is the angle α between and defined by the arrival direction vector 504 and the normal vector 502.

The method 400 may then proceed to 412, where the determination of whether to mute a portion of the wavefield may be made. In this respect, the wavefield refers to the waves that are reflected by the interface, which may be recorded by the receivers. Accordingly, at 412, the method 400 may include comparing, at the locations along the interface, the angle of incidence (e.g., the arrival angle in the reference frame defined by the normal to the interface) to the critical angle. If the angle of incidence is greater than the critical angle (i.e., determination at 412 is 'YES'), the method 400 may proceed attenuating a portion of the wavefield associated with the location, as at 414, e.g., the upgoing wavefield generated by a reflection at the location. Otherwise (determination at 412 is 'NO'), the method 400 may determine that attenuation is not to be conducted, as at 416.

Embodiments of the present disclosure may proceed on a shot-by-shot basis, or may proceed by collecting several shots and applying the method 600 thereto (e.g., by calculating multiple angles of incidence at each location). Further, it will be appreciated that the method 400 may be applied to a plurality of locations along one or a plurality of interfaces. For example, a seismic source may generate one or more rays that define the arrival direction vector mentioned above, which may be incident at a plurality of locations along the interface. Thus, the method 400 may include determining the arrival direction vector orientation for one, some, or all such locations, for one some or all rays incident on the interface location, and along one, some, or all interfaces found in the model. Similarly, the method 400 may include determining the normal vector orientation for one, some, or all such locations of one, some, or all interfaces.

Further, the method 400 may include displaying and interpreting the stacked image, generated using the modified wavefield, which may allow for more accurately display the physical characteristics of the subterranean domain. From this information, exploration, drilling, completion, or other types of decisions related to physical worksteps may be made, potentially resulting in changes in such work.

In some embodiments, the attenuating at 414 may begin at the critical angle, e.g., when the angle of incidence is greater than the critical angle, the wavefield associated with that angle of incidence may be muted, or substantially muted (e.g., the value thereof multiplied by zero or nearly zero). Accordingly, in some embodiments, a weight is calculated, which is multiplied with the value resulting from applying an imaging condition to the wavefield, prior to addition (stack) of this contribution to the cumulative migrated image.

Figure 6:
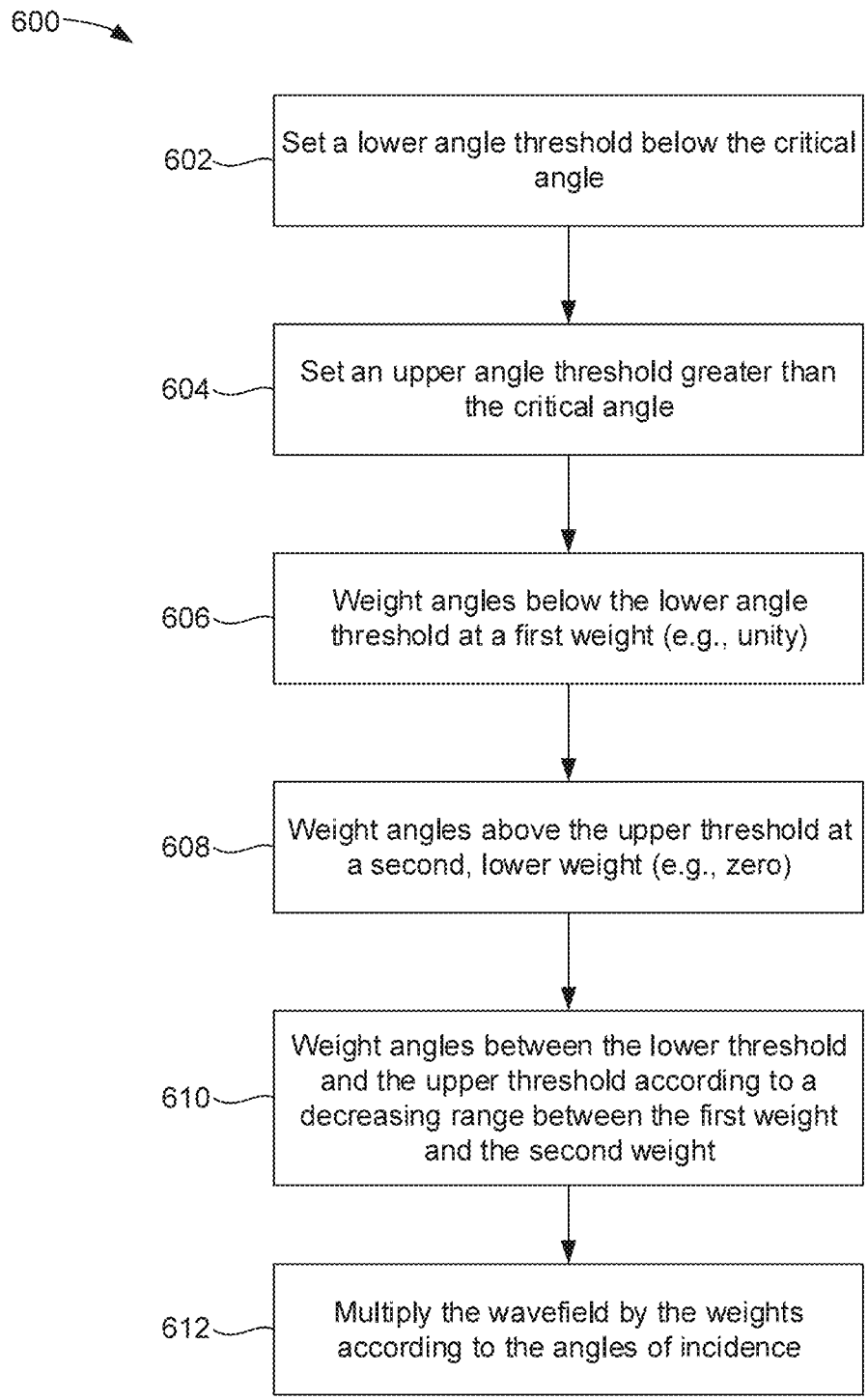
FIG. 6 illustrates a flowchart of a method for attenuating post-critical wavefield reflections, according to an embodiment. The method for attenuating may be part of an embodiment of the method for muting, e.g., as illustrated in FIG. 4.

In some situations, however, it may be desirable to smoothly attenuate the wavefield, and thus avoid such an abrupt muting of the wavefield. By way of example of such smooth attenuating, FIG. 6 illustrates a flowchart of a method 600 for attenuating a portion of a wavefield in a velocity model, according to an embodiment. Again, it will be appreciated that the method 600 may be an example of the attenuating at 414, and thus may form a part of the method 400. The methods 400 and 600 should thus not be considered mutually exclusive.

The method 600 may include setting a lower angle threshold below the critical angle (as determined, e.g., at 402), as at 602. The lower angle threshold may be any angle that is less than the critical angle, and thus may be defined according to a buffer (e.g., critical angle minus buffer). The method 600 may also include setting an upper angle threshold, which may be determined based on a buffer (whether the same or a different buffer than was used for setting the lower angle threshold), as at 604. The width of the transition section (e.g., the value of the buffers) between the upper and lower angle thresholds may be determined empirically.

The method 600 may then weight angles below the lower angle threshold at a substantially constant first weight (e.g., unity), as at 606. In some cases, the first weight may be modified slightly for different angles, or may remain constant. The method 600 may also weight angles above the upper threshold at a substantially constant second weight that is lower than the first weight (e.g., zero or substantially zero), as at 608. In some cases, the second weight may vary slightly for different angles, or may remain constant, consistent with the term "substantially constant." The method 600 may then smoothly transition from the first weight to the second weight by weighing angles between the lower threshold and the upper threshold according to a decreasing range between the first and second weights, as at 610. This transition weighting may be linearly decreasing, exponentially decreasing, or decreasing according to any other regime. Upon setting appropriate weights, energy values of the wavefield may be multiplied by their associated weights, as at 612. Further, after calculating the weights, the weights may be further refined or adjusted, e.g., to smooth the results in the velocity model spatially.

Figure 7:
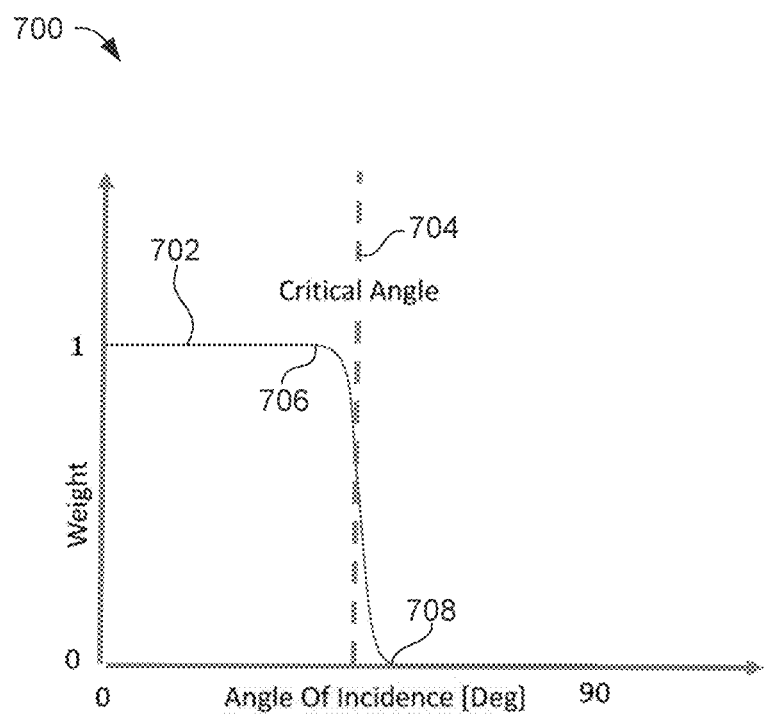
FIG. 7 illustrates a plot of weights set for rays of a wavefield based on the angle of incidence associated therewith versus the critical angle, according to an embodiment.

FIG. 7 illustrates an example of a plot 700 of the weights assigned to the angles of incidence relative to the critical angle, according to an embodiment. Line 702 represents the weights assigned to the angles of incidence. Line 704 indicates the critical angle. Point 706 represents the lower threshold, and point 708 represents the upper threshold. Thus, as shown, the wavefield associated with angles of incidence below the lower threshold may be weighted generally at unity, and thus unchanged, while the wavefield associated with angles of incidence above the upper threshold may weighted by zero or substantially zero, and may thus be muted, or at least heavily attenuated upon multiplying the wavefield by its associated weight. The wavefield associated with the angles in the transition range between the upper and lower threshold 706, 708 may be attenuated according to the assigned weights between zero and one. It will be appreciated that the specific number assigned to the weights may be changed to any number, without departing from the weighting discussed herein.

Further, the value of the weighting function can be parameterized in a variety of manners, and thus the function that generates the plot 700 should not be considered limiting. Indeed, in other embodiments, the weight may to zero at the critical angle, with a relatively gradual transition from unity for angles below, the weight may go to zero above the critical angle with a relatively gradual transition from unity, the weight may go from unity at the critical angle to zero above with a relative gradual transition from unity, or the weight may go from unity at the critical angle to zero beyond it with a relatively rapid transition from unity. These and other embodiments of such weighting functions are within the scope of the present disclosure.

Figure 8A:
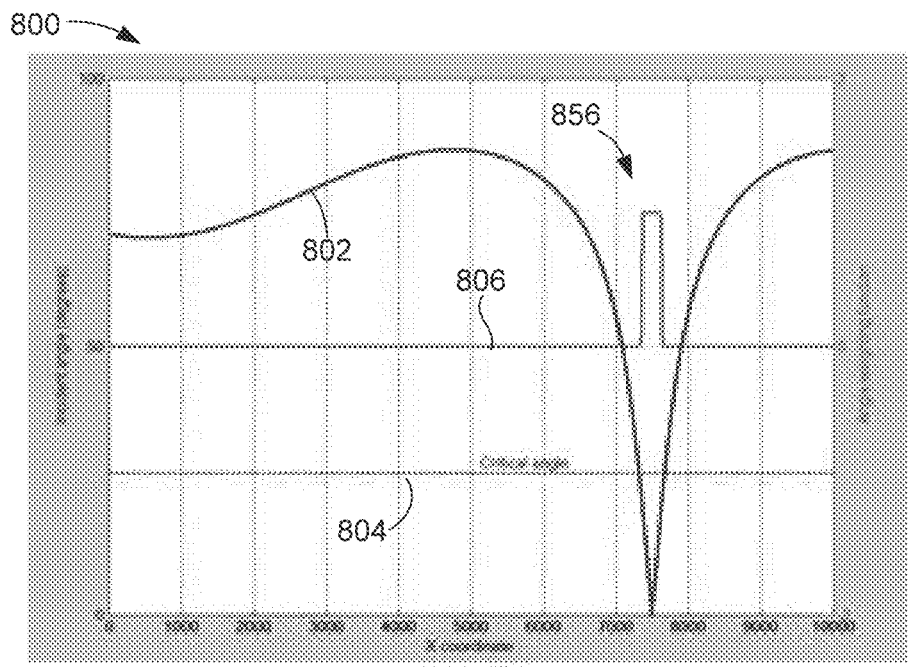
FIG. 8A illustrates a plot of the angle of incidence, critical angle, and a muting function of a simple example of a velocity model for an interface, according to an embodiment.
Figure 8B:
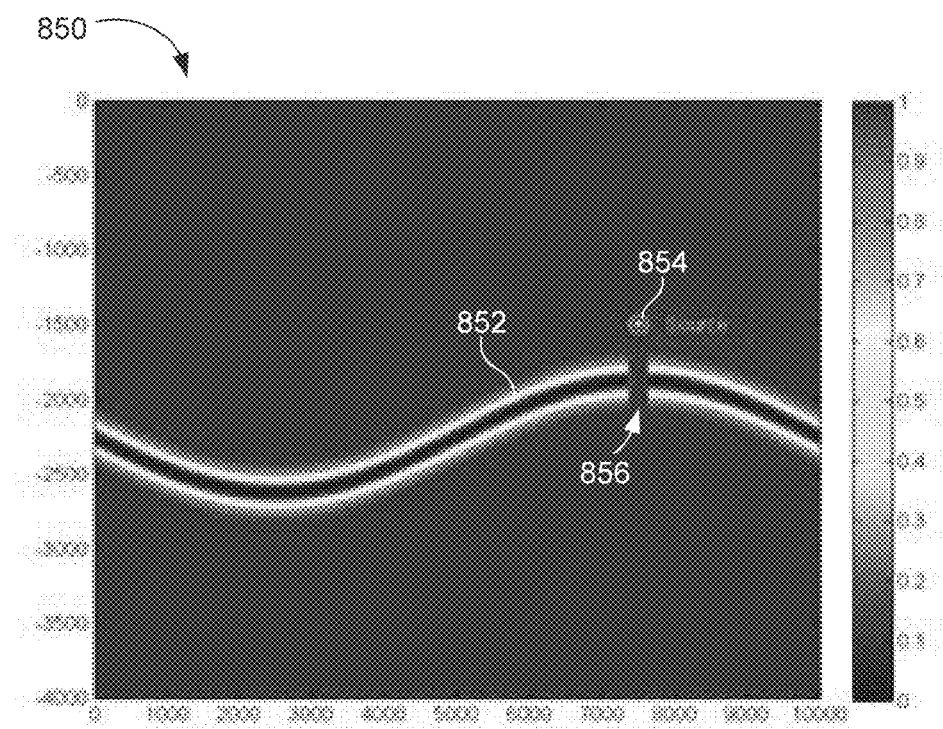
FIG. 8B illustrates the velocity model including the interface after the attenuating has been conducted, according to an embodiment.

FIGS. 8A and 8B further illustrate an example of an implementation of the method 400. In particular, FIG. 8A shows a plot 800 of an angle of incidence (line 802), along with a critical angle (line 804), which is constant in this embodiment, for an interface. Line 806 illustrates the weights assigned to the wavefield, based on the angles of incidence. In the same scale, FIG. 8B shows weights applied in a "modified" velocity model 850 including an interface 852 and a seismic source 854.

The modified velocity model 850 is characterized as "modified" because an embodiment of the method 600 has been applied thereto. The magnitude of the weight varies in a complicated manner with source-reflection point offset as the amplitude between the interface normal and the propagation angle changes. As a result, a large portion of the interface 852 in this example is attenuated, and a relatively small portion 856 remains such that it may subsequently contribute to the stacked image. Referring back to FIG. 8B, this same portion 856 is shown. As can be seen, the weighting function (illustrated by line 806) spikes up at this point, as the angle of incidence, represented by line 802, drops below the critical angle represented by line 804. The remainder of the angle of incidence line 802 indicates the angle of incidence is post-critical (greater than the critical angle), and thus is muted.

Figure 9A:
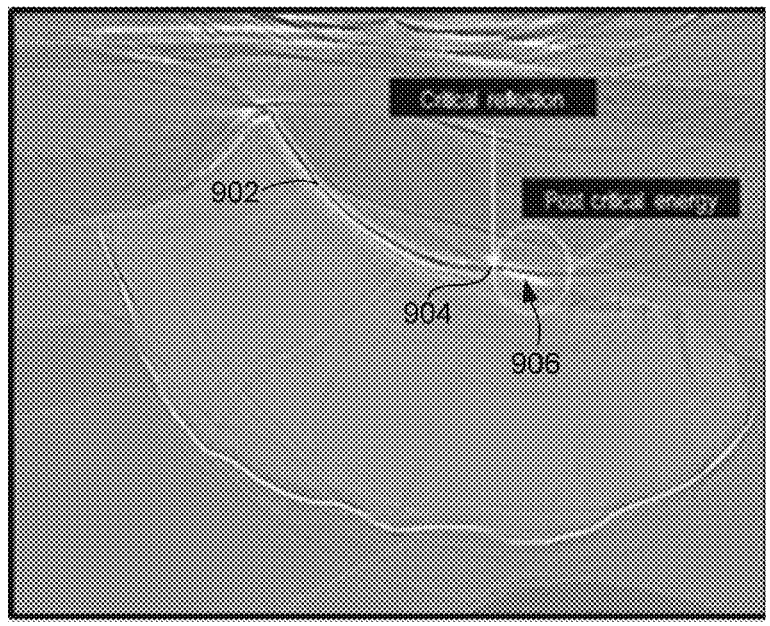
FIGS. 9A and 9B illustrate a velocity model before and after attenuating, illustrating a muting of post-critical energy in the model, according to an embodiment.
Figure 9B:
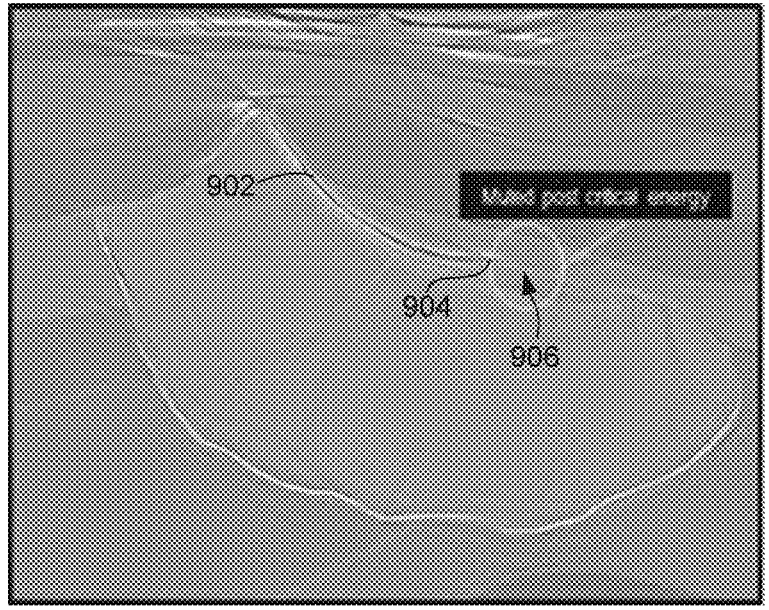

FIGS. 9A and 9B illustrate two more realistic examples of a velocity model 900 (FIG. 9A) and a modified velocity model 950 (FIG. 9B), according to an embodiment. As indicated along an interface 902, a critical reflection (e.g., angle of incidence equals critical angle) is located at 904, with the nearby reflections being post-critical in area 906. Accordingly, these post-critical reflections may be muted by one of the weighting techniques discussed above, resulting in removal of the post-critical reflections in area 906 in the modified model 950.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 10:
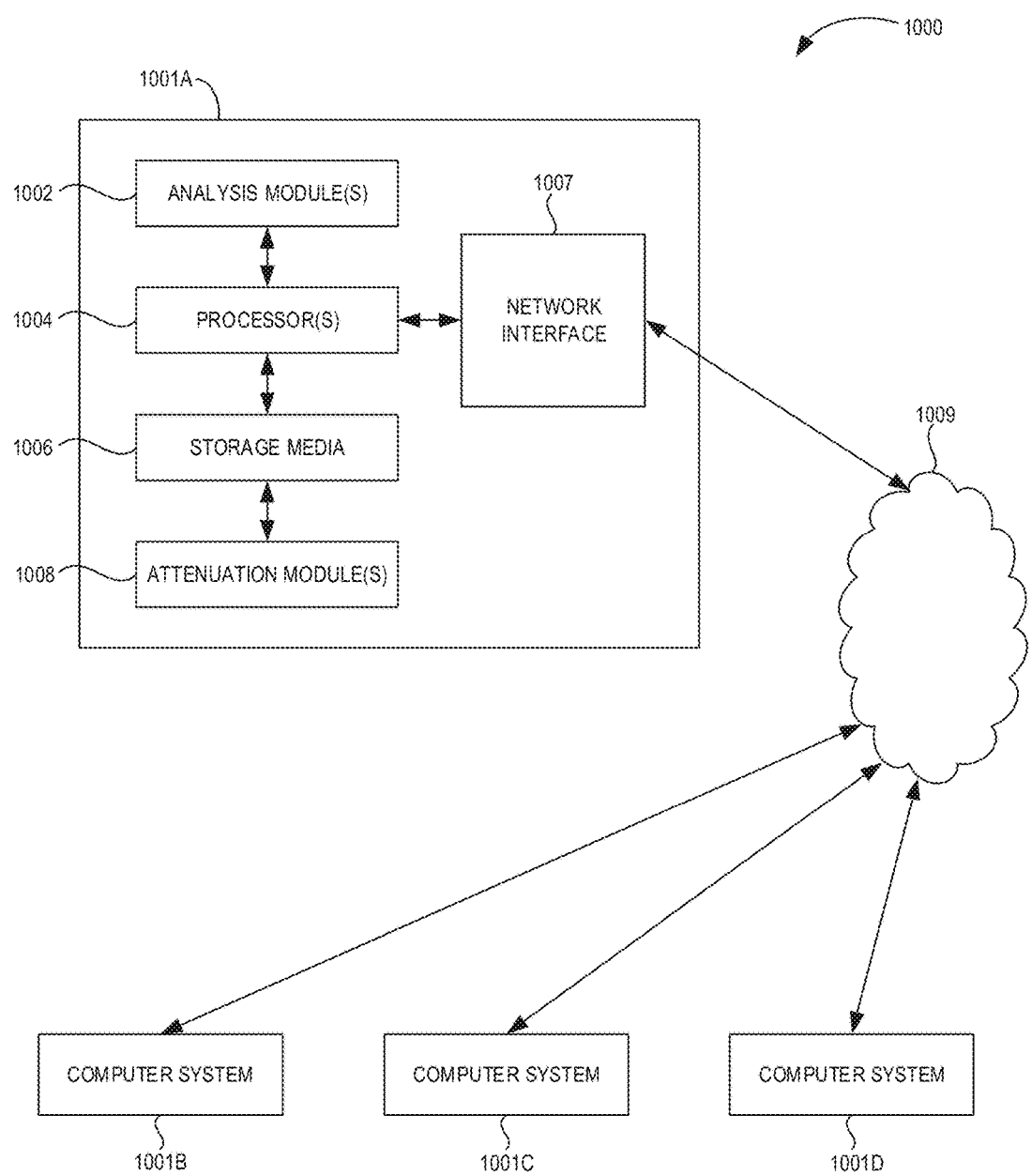
FIG. 10 illustrates a schematic view of a computing system, according to an embodiment.

In some embodiments, any of the methods of the present disclosure may be executed by a computing system. FIG. 10 illustrates an example of such a computing system 1000, in accordance with some embodiments. The computing system 1000 may include a computer or computer system 1001A, which may be an individual computer system 1001A or an arrangement of distributed computer systems. The computer system 1001A includes one or more analysis module(s) 1002 configured to perform various tasks according to some embodiments, such as one or more methods disclosed herein. To perform these various tasks, the analysis module 1002 executes independently, or in coordination with, one or more processors 1004, which is (or are) connected to one or more storage media 1006. The processor(s) 1004 is (or are) also connected to a network interface 1007 to allow the computer system 1001A to communicate over a data network 1009 with one or more additional computer systems and/or computing systems, such as 1001B, 1001C, and/or 1001D (note that computer systems 1001B, 1001C and/or 1001D may or may not share the same architecture as computer system 1001A, and may be located in different physical locations, e.g., computer systems 1001A and 1001B may be located in a processing facility, while in communication with one or more computer systems such as 1001C and/or 1001D that are located in one or more data centers, and/or located in varying countries on different continents).

A processor can include a microprocessor, microcontroller, processor module or subsystem, programmable integrated circuit, programmable gate array, or another control or computing device.

The storage media 1006 can be implemented as one or more computer-readable or machine-readable storage media. Note that while in the example embodiment of FIG. 10 storage media 1006 is depicted as within computer system 1001A, in some embodiments, storage media 1006 may be distributed within and/or across multiple internal and/or external enclosures of computing system 1001A and/or additional computing systems. Storage media 1006 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLU-RAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1000 contains one or more attenuation module(s) 1008. In the example of computing system 1000, computer system 1001A includes the attenuation module 1008. In some embodiments, a single attenuation module may be used to perform some or all aspects of one or more embodiments of the methods. In alternate embodiments, a plurality of attenuation modules may be used to perform some or all aspects of methods.

It should be appreciated that computing system 1000 is only one example of a computing system, and that computing system 1000 may have more or fewer components than shown, may combine additional components not depicted in the example embodiment of FIG. 10, and/or computing system 1000 may have a different configuration or arrangement of the components depicted in FIG. 10. The various components shown in FIG. 10 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1000, FIG. 10), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for processing seismic data, comprising:
   obtaining a velocity model of a subterranean domain;
   determining a critical angle for an interface represented in the velocity model based on a ratio between a seismic wave velocity on a first side of the interface and a seismic wave velocity on a second side of the interface;
   determining an orientation of a normal vector extending normal to a location of the interface;
   determining an orientation of an arrival direction vector of a wavefield at the location of the interface;
   calculating an angle between the normal vector and the arrival direction vector;
   determining that the angle between the normal vector and the arrival direction vector is greater than the critical angle at the location; and
   attenuating a portion of energy represented in the seismic data that corresponds to the wavefield associated with the location in response to determining that the angle between the normal vector and the arrival direction vector is greater than the critical angle at the location, wherein the attenuating comprises using the angle that is greater than the critical angle to assign a weight from a range of weights that correspond to a range of angles greater than the critical angle and using the weight for smoothing a transition from unattenuated to attenuated portions of the energy represented in the seismic data.

2. The method of claim 1, wherein the velocity model comprises a migration velocity propagation model.

3. The method of claim 1, wherein the attenuating generates attenuated seismic data and further comprising displaying a seismic image using at least the attenuated seismic data, wherein the seismic image comprises at least one smoothed transition region due at least in part to the using the weight for smoothing.

4. The method of claim 1, wherein determining the orientation of the arrival direction vector comprises determining a finite-different solution to an eikonal equation.

5. The method of claim 1, wherein calculating the angle between the normal vector and the arrival direction vector comprises calculating an inverse cosine of a dot product of the normal vector and the arrival direction vector.

6. The method of claim 1, further comprising:
   determining a plurality of orientations of a plurality of normal vectors defined at a plurality of locations along the interface;
   determining a plurality of orientations of a plurality of arrival direction vectors of the wavefield at the plurality of locations;
   determining angles between the plurality of normal vectors and the plurality of arrival direction vectors at the respective locations; and
   attenuating respective portions of energy represented in the seismic data that correspond to the wavefield associated with respective locations along the interface wherein the attenuating comprises using the angles that are greater than the critical angle to assign weights from the range of weights that correspond to the range of angles greater than the critical angle and using the weights for smoothing at least the transition from unattenuated to attenuated portions of the energy represented in the seismic data.

7. The method of claim 6, further comprising smoothing the plurality of normal vectors, the range of weights, or both to reduce variation spatially.

8. The method of claim 6, further comprising preselecting the interface based on a depth range, a velocity ratio associated with the interface, or a combination thereof.

9. The method of claim 1 wherein the portion of energy represented in the seismic data comprises post-critical energy at a boundary.

10. The method of claim 1 wherein the boundary comprises a salt boundary, a carbonate boundary or a sea-floor boundary.

11. The method of claim 1 wherein the attenuating generates attenuated seismic data and comprising generating and displaying a stacked seismic image using at least the attenuated seismic data and characterizing the subterranean domain using the stacked seismic image at least in part via a boundary in the subterranean domain that is represented in the stacked seismic image with a smoothed transition in a region due at least in part to using the weight for smoothing.

12. The method of claim 1 wherein the portion of energy represented in the seismic data that corresponds to the wavefield comprises one or more values and wherein the attenuating comprises multiplying at least one of the one or more values by the weight.

13. A computing system, comprising:
   one or more processors; and
   a memory system comprising one or more non-transitory media storing instructions that, when executed by at least one of the one or more processors, cause the computing system to perform operations, the operations comprising:
      obtaining a velocity model of a subterranean domain;
      determining a critical angle for an interface represented in the velocity model based on a ratio between a seismic wave velocity on a first side of the interface and a seismic wave velocity on a second side of the interface;

determining an orientation of a normal vector extending normal to a location of the interface;

determining an orientation of an arrival direction vector of a wavefield at the location of the interface;

calculating an angle between the normal vector and the arrival direction vector;

determining that the angle between the normal vector and the arrival direction vector is greater than the critical angle at the location; and attenuating a portion of energy represented in the seismic data that corresponds to the wavefield associated with the location in response to determining that the angle between the normal vector and the arrival direction vector is greater than the critical angle at the location, wherein the attenuating comprises using the angle that is greater than the critical angle to assign a weight from a range of weights that correspond to a range of angles greater than the critical angle and using the weight for smoothing a transition from unattenuated to attenuated portions of the energy represented in the seismic data.

14. The system of claim 13, wherein the velocity model comprises a migration velocity propagation model.

15. The system of claim 13, wherein the operations further comprise displaying seismic image of the seismic data after the attenuating.

16. The system of claim 13, wherein the operations further comprise:

determining a plurality of orientations of a plurality of normal vectors defined at a plurality of locations along the interface;

determining a plurality of orientations of a plurality of arrival direction vectors of the wavefield at the plurality of locations;

determining angles between the plurality of normal vectors and the plurality of arrival direction vectors at the respective locations; and attenuating respective portions of energy represented in the seismic data that correspond to the wavefield associated with respective locations along the interface wherein the attenuating comprises using the angles that are greater than the critical angle to assign weights from the range of weights that correspond to the range of angles greater than the critical angle and using the weights for smoothing at least the transition from unattenuated to attenuated portions of the energy represented in the seismic data.

17. The system of claim 16, further comprising smoothing the plurality of normal vectors, the range of weights, or both to reduce variation spatially.

18. The system of claim 16, further comprising preselecting the interface based on a depth range, a velocity ratio associated with the interface, or a combination thereof.

19. A non-transitory medium storing instructions that, when executed by at least one processor of a computing system, cause the computing system to perform operations, the operations comprising:

obtaining a velocity model of a subterranean domain;

determining a critical angle for an interface represented in the velocity model based on a ratio between a seismic wave velocity on a first side of the interface and a seismic wave velocity on a second side of the interface;

determining an orientation of a normal vector extending normal to a location of the interface;

determining an orientation of an arrival direction vector of a wavefield at the location of the interface;

calculating an angle between the normal vector and the arrival direction vector;

determining that the angle between the normal vector and the arrival direction vector is greater than the critical angle at the location; and attenuating a portion of energy represented in the seismic data that corresponds to the wavefield associated with the location in response to determining that the angle between the normal vector and the arrival direction vector is greater than the critical angle at the location, wherein the attenuating comprises using the angle that is greater than the critical angle to assign a weight from a range of weights that correspond to a range of angles greater than the critical angle and using the weight for smoothing a transition from unattenuated to attenuated portions of the energy represented in the seismic data.

20. The system of claim 19, wherein the operations further comprise:

determining a plurality of orientations of a plurality of normal vectors defined at a plurality of locations along the interface;

determining a plurality of orientations of a plurality of arrival direction vectors of the wavefield at the plurality of locations;

determining angles between the plurality of normal vectors and the plurality of arrival direction vectors at the respective locations; and attenuating respective portions of energy represented in the seismic data that correspond to the wavefield associated with respective locations along the interface wherein the attenuating comprises using the angles that are greater than the critical angle to assign weights from the range of weights that correspond to the range of angles greater than the critical angle and using the weights for smoothing at least the transition from unattenuated to attenuated portions of the energy represented in the seismic data.

* * * * *